(12) United States Patent
Choi et al.

(10) Patent No.: US 10,431,783 B2
(45) Date of Patent: Oct. 1, 2019

(54) BATTERY PACK

(71) Applicant: LG CHEM, LTD., Seoul (KR)

(72) Inventors: Yang-Kyu Choi, Daejeon (KR); Seong-Tae Kim, Daejeon (KR); Jun-Yeob Seong, Daejeon (KR); Hyuk An, Daejeon (KR); Sang-Yoon Jeong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 172 days.

(21) Appl. No.: 15/533,090

(22) PCT Filed: Jan. 12, 2016

(86) PCT No.: PCT/KR2016/000298
§ 371 (c)(1),
(2) Date: Jun. 5, 2017

(87) PCT Pub. No.: WO2016/140430
PCT Pub. Date: Sep. 9, 2016

(65) Prior Publication Data
US 2018/0261809 A1 Sep. 13, 2018

(30) Foreign Application Priority Data
Mar. 4, 2015 (KR) .................. 10-2015-0030504

(51) Int. Cl.
*H01M 2/02* (2006.01)
*H01M 2/10* (2006.01)
(Continued)

(52) U.S. Cl.
CPC ....... *H01M 2/1061* (2013.01); *H01M 2/0217* (2013.01); *H01M 10/0525* (2013.01);
(Continued)

(58) Field of Classification Search
None
See application file for complete search history.

(56) References Cited

U.S. PATENT DOCUMENTS 4,118,265 A * 10/1978 Hardigg ................ B29C 31/006
156/242
7,547,487 B1 * 6/2009 Smith .................. H01M 2/0242
429/100
(Continued)

FOREIGN PATENT DOCUMENTS

CN 203071146 U 7/2013
EP 2 333 874 A1 6/2011
(Continued)

OTHER PUBLICATIONS

International Search Report, issued in PCT/KR2016/000298 (PCT/ISA/210), dated Apr. 29, 2016.

*Primary Examiner* — Scott J. Chmielecki
(74) *Attorney, Agent, or Firm* — Birch, Stewart, Kolasch & Birch, LLP (57) ABSTRACT

The present disclosure discloses a battery pack that realizes miniaturization and weight reduction by minimizing the number of components of the structure, and that is suitable for pursuing dispersion of external force and structural rigidity using the shape of the structure. The battery pack according to the present disclosure is characterized to include a lower case including both inclined side walls and fixating members facing each other at the both side walls, a battery cartridge disposed between the fixating members in the lower case, and an upper case covering the lower case and the battery cartridge, wherein the battery cartridge contacts the both side walls and the fixating members in the lower case.

19 Claims, 8 Drawing Sheets

(51) Int. Cl.
  *H01M 10/0525* (2010.01)
  *H01M 10/052* (2010.01)
(52) U.S. Cl.
  CPC ............ *H01M 2/02* (2013.01); *H01M 10/052* (2013.01); *H01M 2220/20* (2013.01)

(56) References Cited

U.S. PATENT DOCUMENTS

| | | | |
|---|---|---|---|
| 7,993,776 B2 | 8/2011 | Lee et al. | |
| 8,872,482 B2 | 10/2014 | Jung | |
| 9,502,739 B2 | 11/2016 | Han et al. | |
| 2005/0058899 A1* | 3/2005 | Rivetta | H01M 2/024 429/176 |
| 2005/0255379 A1* | 11/2005 | Marchio | H01M 2/0242 429/153 |
| 2010/0151315 A1* | 6/2010 | Wiepen | H01M 2/0242 429/160 |
| 2012/0015226 A1* | 1/2012 | Kim | H01M 2/0262 429/94 |
| 2013/0045414 A1* | 2/2013 | Okumura | H01M 2/266 429/179 |
| 2013/0177794 A1 | 7/2013 | Shim | |
| 2014/0011058 A1* | 1/2014 | Adachi | H01M 10/425 429/61 |
| 2014/0014418 A1* | 1/2014 | Komaki | H01M 2/1077 180/65.1 |
| 2014/0014420 A1* | 1/2014 | Nakamura | H01M 2/1077 180/65.1 |
| 2014/0147733 A1* | 5/2014 | Kim | H01M 2/043 429/175 |
| 2014/0322566 A1* | 10/2014 | Kim | H01M 2/1016 429/56 |
| 2014/0363724 A1* | 12/2014 | Osaki | H01M 2/024 429/131 |
| 2015/0171479 A1* | 6/2015 | Fujita | H01M 10/12 429/175 |
| 2016/0111702 A1* | 4/2016 | Ohsumi | H01M 2/1083 429/179 |

FOREIGN PATENT DOCUMENTS

| | | |
|---|---|---|
| EP | 2 328 205 B1 | 7/2013 |
| JP | 2010-211950 A | 9/2010 |
| JP | 2010211950 A * | 9/2010 |
| JP | 2011-134554 A | 7/2011 |
| JP | 2014-165003 A | 9/2014 |
| KR | 10-2007-0100555 A | 10/2007 |
| KR | 10-2011-0059252 A | 6/2011 |
| KR | 10-2012-0074415 A | 7/2012 |
| KR | 10-1000550 B1 | 12/2012 |
| KR | 10-2014-0144787 A | 12/2014 |
| WO | WO 2012/164730 A1 | 12/2012 |

* cited by examiner

BATTERY PACK

TECHNICAL FIELD

The present application claims the benefit of Korean Patent Application No. 10-2015-0030504 filed on Mar. 4, 2015 with the Korean Intellectual Property Office, the disclosure of which is incorporated herein by reference in its entirety.

The present disclosure relates to a battery pack that realizes miniaturization and weight reduction of a structure through an assembly form of components inside the structure, and that is suitable for pursuing structural rigidity of the structure and dispersion of external force in the structure through a surface form of the structure outside the structure.

BACKGROUND ART

Recently, vehicles are manufactured based on studies conducted to secure driving force using internal combustion engines and/or electric motors, in order to reduce air pollution from exhaust gas of vehicles. Accordingly, the vehicles have evolved in the order of hybrid vehicles, plug-in hybrid vehicles and electric vehicles. In this case, the hybrid vehicles and plug-in hybrid vehicles have an internal combustion engine, an electric motor and a battery pack, and the electric vehicles have an electric motor and a battery pack, but not an internal combustion engine.

Accordingly, the battery pack has evolved together with hybrid vehicles, plug-in hybrid vehicles and electric vehicles. The battery pack is configured to be chargeable from outside an electric vehicle. The battery pack has a pack case and a battery module, and the pack case comprises a lower case and an upper case, thereby encasing the battery module. The battery module has battery cells and cartridges. The cartridge is configured to accommodate one or more battery cells. Here, the battery module is configured to secure the cartridges physically into one configuration.

The battery module has one or more auxiliary components to secure the cartridges. In order to realize the battery pack, the battery module is screw-coupled to the lower case using the auxiliary component. In this case, the coupling of the battery module and the lower case increases the number of components of the battery pack and increases the volume of the battery pack. Therefore, numerous studies to minimize the number of components of the battery pack and to reduce the volume of the battery pack are being conducted. One example of the studies was disclosed in the 'battery pack' of EP 2 328 205 B1 (granted date; Jul. 17, 2013).

A plurality of such battery packs are accommodated in a housing, thereby forming a battery pack module together with the housing. The battery pack includes batteries and a case. The case accommodates the batteries. Here, the case has sliding ribs at both side portions. The battery pack is inserted into a slot of the housing using the sliding ribs of the case. Since the case is not screw-coupled to the housing, it does not increase the number of components of the battery pack module.

However, since the housing has a flat outer circumferential surface and a bent inner circumferential surface, and has a different thickness per location along the inner surface, when the housing repeatedly receives external force through the outer circumferential surface, the housing is repeatedly bent and unbent by the effect of the external force, and is thus permanently crushed or broken later on. Deformation of the initial shape of the housing makes it difficult to accommodate the cases and/or batteries through the housing with stability.

Further, since the battery pack module is configured to secure the battery packs into one configuration through bus bars, when the housing receives external force, the battery packs deliver the external force to the cases and the batteries at the same time having the cases and the batteries in one bundle. Therefore, affected by the external force, the cases and the batteries have a uniform stress in most of the battery packs. The stress causes deformation in the cases and/or batteries during the life expectancy of use of the battery packs. The deformation of the cases and/or batteries shortens the life expectancy of use of the battery packs.

DISCLOSURE

Technical Problem

The present disclosure is designed to solve the problems of the related art, and therefore the present disclosure is directed to providing a battery pack that realizes miniaturization and weight reduction through an assembly form of a lower case and cartridges inside the lower case, and that is suitable for pursuing dispersion of external force, structural rigidity of the lower case, and minimization of deformation during plastic injection of the lower case, outside the lower case, in the lower case and an upper case that are stacked sequentially.

Technical Solution

In one aspect of the present disclosure, there is provided a battery pack including a lower case including both side walls inclined from a lower side towards an upper side, and fixating members facing each other at the both side walls; at least one battery cartridge accommodated in the lower case to be disposed between the fixating members; and an upper case disposed on the lower case to cover the battery cartridge, wherein the battery cartridge includes a taxiing member contacting the both side walls and the fixating members in the low case.

According to the present disclosure, in the lower case, a thickness of the side wall defining the fixating members, and a thickness of the side wall between the fixating members, may be the same.

Preferably, the both side walls may space apart from each other from the lower side towards the upper side of the lower case.

In one aspect, the both side walls may have a greater width at the upper side than at the lower side in the lower case.

According to the present disclosure, each of the fixating members may have a concave part on an outer circumferential surface and a convex part on an inner circumferential surface in the lower case.

Here, each of the fixating members may have a slot on the outer circumferential surface and an auxiliary fixating member corresponding to the slot on the inner circumferential surface, in the lower case.

Preferably, the slot may have a smaller width at the upper side than at the lower side of the lower case.

More preferably, the auxiliary fixating member may have protrusions extending towards the battery cartridges at a periphery of the taxiing member of the battery cartridge.

In one aspect, the fixating members may have a greater width at the upper side than at the lower side in the lower case.

In another aspect, the fixating members may protrude from the inner circumferential surface of the lower case by a same length.

According to the present disclosure, the battery cartridge may include at least one battery cell, and cartridges surrounding the battery cell in a sandwich structure.

Preferably, the taxiing member may hook-couple the cartridges of the battery cartridge.

In one aspect, the taxiing member may be disposed in a line from the lower side towards the upper side of the lower case.

In another aspect, the taxiing member may have a same size as a width between the fixating members at the lower side of the lower case, and have a smaller size than a width between the fixating members at the upper side of the lower case.

In another aspect, the taxiing member may have a same size as a width between the fixating members at the lower side and the upper side of the lower case.

In another aspect, the taxiing member may protrude from the both side portions of the battery cartridge by a longer length at the upper side than at the lower side of the lower case.

Here, the taxiing member may include hook members and a hook accommodating member to be coupled with the hook members in the cartridges, in order to secure two cartridges in the battery cartridge.

Preferably, the hook members may be disposed in a line in an isolated shape in each of both side portions of one cartridge, and the hook accommodating member may be disposed in a line in a line shape in each of the both side portions of the remaining cartridge.

More preferably, the hook members and the hook accommodating member may protrude from each of the both side portions of the battery cartridge by a same length at a same level.

According to the present disclosure, the lower case and the battery cartridge may gradually space apart from each other from the lower side towards the upper side of the lower case when seen from an arrangement direction of the both side walls.

According to the present disclosure, the lower case and the upper case may isolate the battery cartridge between the fixating members within the lower case.

Advantageous Effects

The battery pack according to the present disclosure uses fixating members having convex shapes inside a lower case, and may thus individually fixate cartridges between the fixating members without using a bus bar and/or screw member, and therefore reduces volume and weight, thereby realizing miniaturization and weight reduction.

The battery pack according to the present disclosure has slots on an outer circumferential surface outside the lower case to correspond to each of the fixating members of the lower case, and may thus disperse external force using the curve of the outer circumferential surface, thereby improving the structural rigidity of the lower case.

In the battery pack according to the present disclosure, a thickness of the outer circumferential surface defining a groove of the slot in the lower case and a thickness of the outer circumferential surface disposed between the slots may be identical to each other, in order to provide a lower case with minimum deformation during plastic injection.

The battery pack according to the present disclosure may have both side walls that are inclined from a lower side toward an upper side in the lower case, in order to have a lower case that is easily separated from an injection metal mold during plastic injection.

DESCRIPTION OF DRAWINGS

The accompanying drawings illustrate a preferred embodiment of the present disclosure and together with the detailed descriptions below, serve to provide further understanding of the technical spirit of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, and not intended to limit the scope of the disclosure, so it should be understood that other equivalents and modifications could be made thereto without departing from the spirit and scope of the disclosure.

In the embodiments disclosed hereinafter, a battery cell refers to a lithium secondary battery. Here, the lithium secondary battery is a general term for secondary batteries where lithium ions act as operating ions during charging and discharging, thereby causing an electrochemical reaction in a positive electrode and a negative electrode. However, the present disclosure is obviously not limited to the types of batteries.

Figure 1:
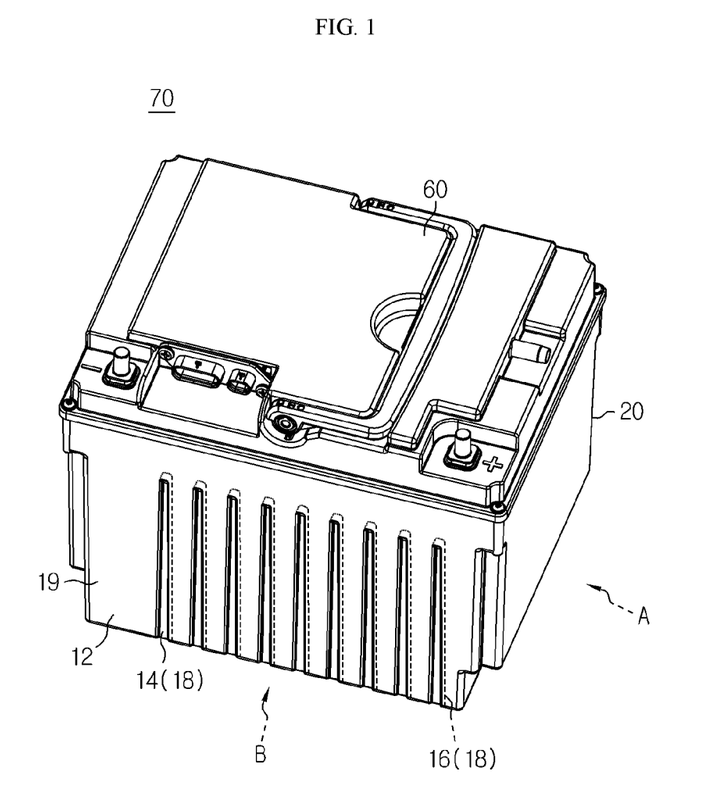
FIG. 1 is a perspective view illustrating a battery pack according to an embodiment of the present disclosure.

FIG. 1 is a perspective view illustrating a battery pack according to an embodiment of the present disclosure.

Referring to FIG. 1, the battery pack 70 according to the present disclosure includes a lower case 20 and an upper case 60 that are sequentially stacked. The lower case 20 has fixating members 18 repeatedly arranged on both side walls 12 facing each other along direction 13'. Preferably, the fixating members 18 extend from a lower side towards an upper side of the lower case 20.

According to one aspect, the fixating members 18 are arranged such that they correspond to each other one by one and face each other from the both side walls 12. More specifically, the fixating member 18 has a slot 14 on an outer circumferential surface 19 and an auxiliary fixating member 16 on an inner circumferential surface (11 in FIG. 8). The slot 14 and the auxiliary fixating member 16 are arranged in a same position on one side wall 12. That is, the slot 14 comprises a concave part having a dimple shape on the outer circumferential surface 19.

The auxiliary fixating member 16 comprises a convex part having an embossing shape on the inner circumferential surface 11. Meanwhile, the lower case 20 accommodates therein at least one battery cartridge (50 in FIG. 3, FIG. 4 or FIG. 8) between the auxiliary fixating members 16. The upper case 60 is located on the lower case 20 to cover the battery cartridge 50.

Figure 2:
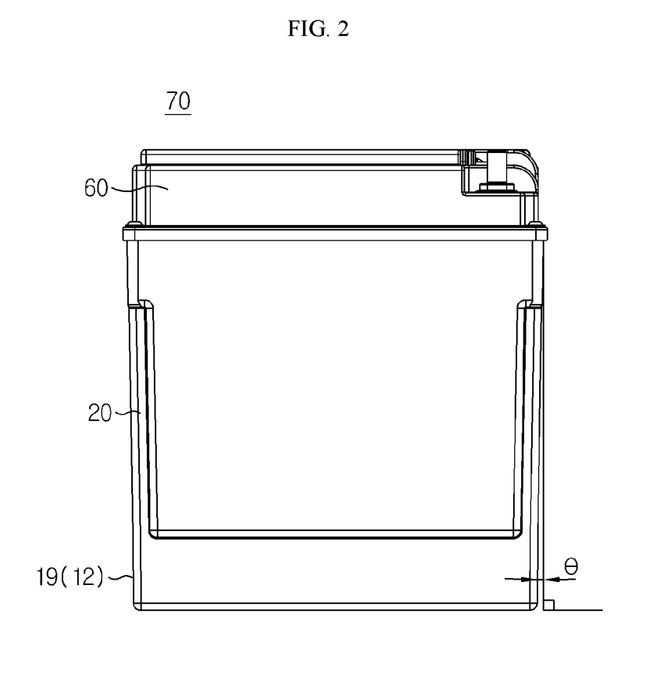
FIG. 2 is a side view illustrating the battery pack from direction 'A' of FIG. 1.

FIG. 2 is a side view illustrating the battery pack from direction 'A' of FIG. 1.

Referring to FIG. 2, in the battery pack 70, the lower case 20 has both side walls 12 inclined from a lower side toward an upper side. Preferably, the both side walls 12 space apart from each other from the lower side towards the upper side of the lower case 20. In one aspect, the both side walls 12 have a greater width at the upper side than at the lower side in the lower case 20.

Therefore, an outer circumferential surface 19 of the both side walls 12 form a certain angle θ with a perpendicular line (a line that forms a right angle with the lower surface of the lower case 12) drawn from the upper side towards the lower side in the lower case 20.

Figure 3:
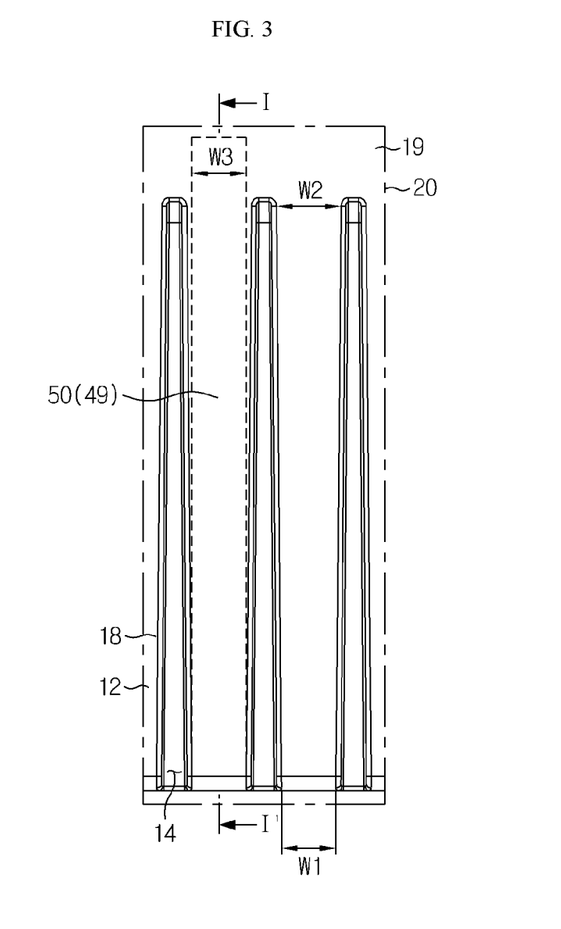
FIG. 3 is a partial front view illustrating the battery pack from direction 'B' of FIG. 1.

FIG. 3 is a partial front view illustrating the battery pack from direction 'B' of FIG. 1.

Referring to FIG. 3, the lower case 20 accommodates at least one battery cartridge 50 between the fixating members 18. Each of the fixating members 18 has a slot 14 on the outer circumferential surface 19 in the side wall 12 of the lower case 20. Preferably, the slot 14 has a smaller width at the upper side than at the lower side in the lower case 20, and thus the fixating members 18 have a greater width at the upper side than at the lower side in the lower case 20.

Here, the lower case 20 has a first width W1 between the fixating members 18 at the lower side. The lower case 20 has a second width W1 between the fixating members 18 at the upper side. The first width W1 has a smaller size than the second width W2. In one aspect, the fixating members 18 protrude from the inner circumferential surface (11 in FIG. 8) of the lower case 20 by a same length.

In the lower case 20, a thickness of the side wall 12 defining the fixating members 18 and a thickness of the side wall 12 between the fixating members 18 are identical to each other. Meanwhile, the battery cartridge 50 is fit-coupled to the fixating members 18 between the fixating members 18. Here, the battery cartridge 50 includes at least one battery cell (34 in FIG. 5), and cartridges (44 and 48 in FIG. 4) surrounding the battery cell 34 in a sandwich structure.

More specifically, the cartridges 44, 48 include a taxiing member 49 that contacts the both side walls 12 and the fixating members 18 in the lower case 20. Preferably, the taxiing member 49 is disposed in a line from the lower side towards the upper side of the lower case 20.

In one aspect, the taxiing member 49 has a same size as the width between the fixating members 18 at the lower side of the lower case 20, and has a smaller size than the width between the fixating members 18 at the upper side of the lower case 20. More specifically, the taxiing member 49 has a third width W3 between the fixating members 18 of the lower case 20. The third width W3 has a same size as the first width W1, and a smaller size than the second width W2.

Figure 4:
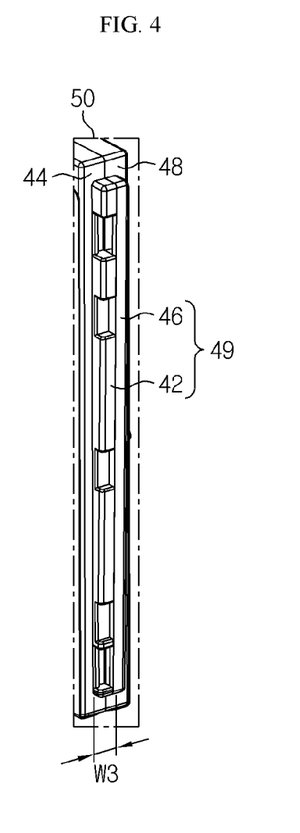
FIG. 4 is a partial perspective view illustrating in detail a side portion of a battery cartridge in FIG. 3.

FIG. 4 is a partial perspective view illustrating in detail a side portion of a battery cartridge of FIG. 3.

Referring to FIG. 4, in the battery cartridge 50, the taxiing member 49 hook-couples the cartridges 44, 48. More specifically, the taxiing member 49 includes hook members 42 and a hook accommodating member 46 to be coupled to the hook members 42 in the cartridges 44, 48 in order to secure two cartridges 44, 48 in the battery cartridge 50.

Preferably, the hook members 42 are disposed in a line in an isolated shape at each of both side portions in one cartridge 44. In one aspect, the hook accommodating member 46 is disposed in a line in a line shape at each of the both side portions in the remaining cartridge 48. In another aspect, the hook members 42 and the hook accommodating member 46 have a third width W3 on the battery cartridge 50.

In yet another aspect, the hook members 42 and the hook accommodating member 46 protrude from each of the both side portions of the battery cartridge 50 by a same length at a same level.

Figure 5:
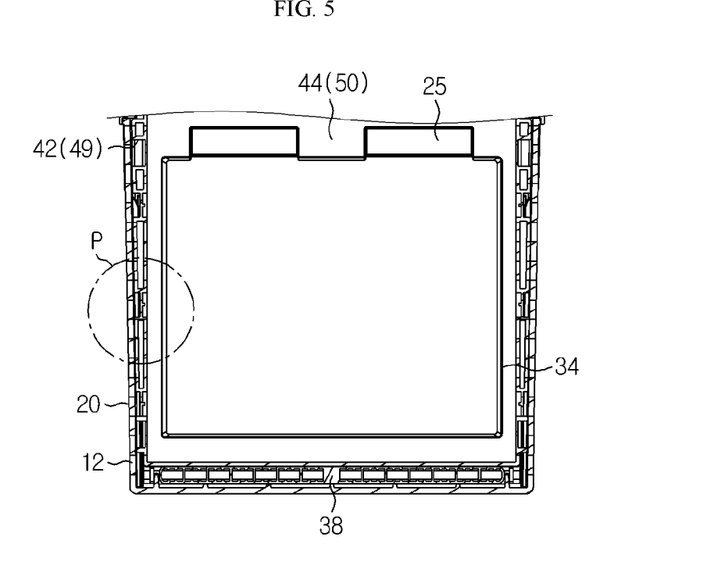
FIG. 5 is a partial side view illustrating the battery pack from direction 'A' of FIG. 1 taken along cutting line I-I' of FIG. 3.

FIG. 5 is a partial side view illustrating battery pack from direction 'A' of FIG. 1 taken along cutting line I-I' of FIG. 3.

Referring to FIG. 5, the lower case 20 contacts the battery cartridge 50 through the side wall 12. More specifically, the battery cartridge 50 contacts the lower case 20 through the taxiing member 49 of the cartridges 44, 48 in FIG. 4. For example, the hook members 42 and the hook accommodating member 46 of the taxiing member 49 contact the lower case 20.

Preferably, the hook members 42 and the hook accommodating member 46 protrude from the both side portions of the battery cartridge 50 by a longer length from the upper side than from the lower side of the lower case 20. Here, for a simple explanation of the present disclosure, only the hook members 42 are illustrated. Meanwhile, the cartridge 44 accommodates the battery cell 34. The battery cell 34 has electrode leads 25 at the upper side of the lower case 20. Further, the lower case 20 accommodates a cooling member 38 below the battery cell 34.

Figure 6:
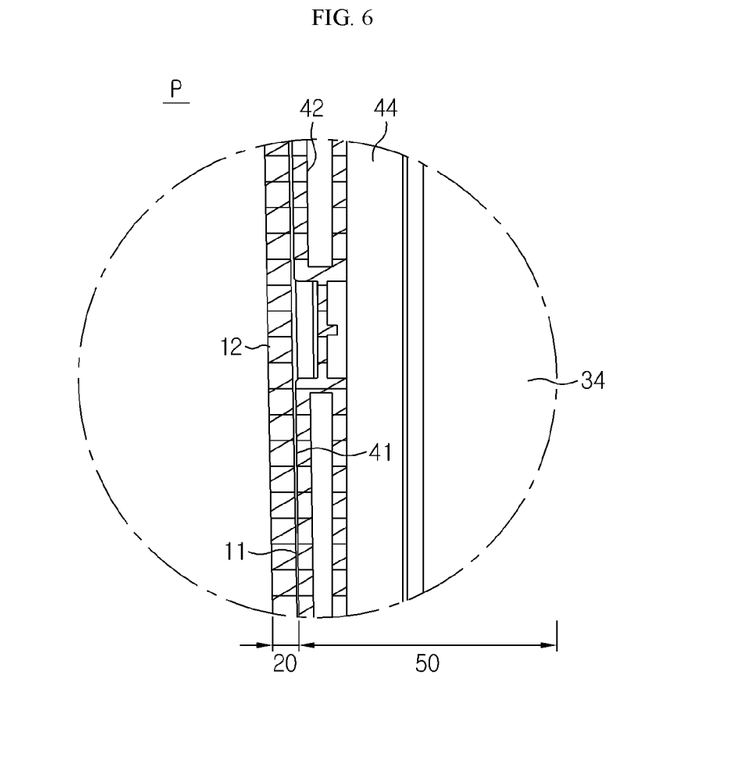
FIG. 6 is a partial expanded view illustrating a coupling relation of a lower case and the battery cartridge in area 'P' of FIG. 5.

FIG. 6 is a partial expanded view illustrating a combination relationship of the lower case and the battery cartridge in area 'P' of FIG. 5.

Referring to FIG. 6, the lower case 20 and the battery cartridge 50 make a close contact at the lower side of the lower case 20, but does not make a close contact at the upper side of the lower case 20. More specifically, the lower case 20 and the battery cartridge 50 gradually space apart from each other while extending from the lower side towards the upper side of the lower case 20 in each of the both side walls 12 of the lower case 20.

For example, when only the hook members 42 of the battery cartridge 50 are illustrated in the drawings, the outer circumferential surface 41 of the hook members 42 of the battery cartridge 50 gradually spaces apart from the inner circumferential surface 11 of the lower case 20 while extending from the lower side towards the upper side of the lower case 20 when seen from an arrangement direction of the both side walls 12 of the lower case 20.

Figure 7:
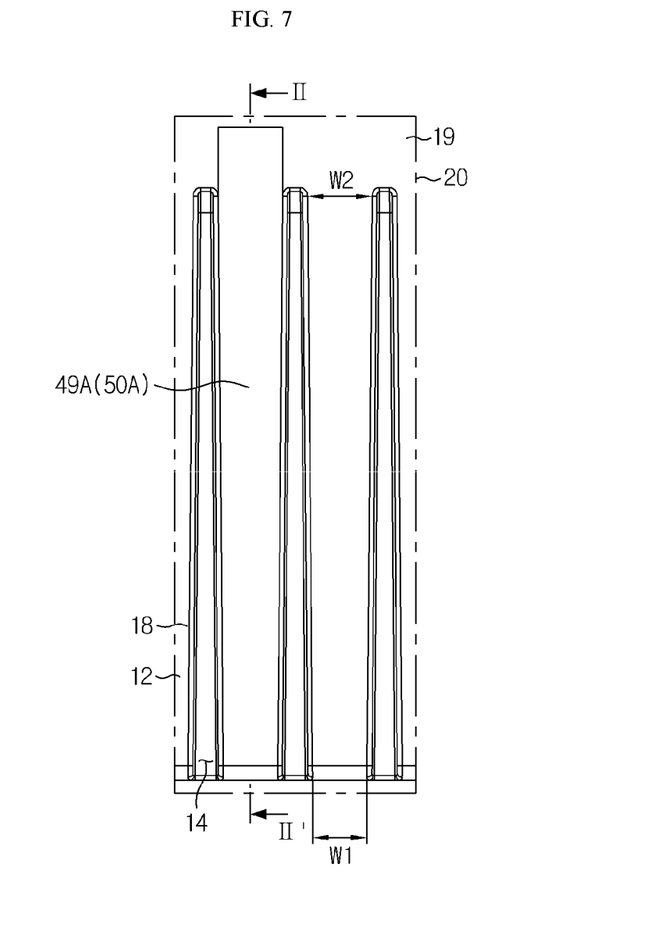
FIG. 7 is a partial front view illustrating a battery pack according to a modified example of FIG. 3.

FIG. 7 is a partial front view illustrating a battery pack according to a modified example of FIG. 3.

Referring to FIG. 7, the battery cartridge 50A according the modified example of the present disclosure is similar to the battery cartridge 50 in FIG. 3. However, the taxiing member 49A of the battery cartridge 50A has a different shape from the taxiing member 49 of the battery cartridge 50. Here, the battery cartridge 50A is accommodated in the lower case 20 of FIG. 3.

More specifically, the taxiing member 49A has a same size as the width between the fixating members 18 at the lower side and the upper side of the lower case 20. That is, the taxiing member 49A has a first width W1 at the lower side of the lower case 20, and has a second width W2 at the upper side of the lower case 20.

Further, just as in FIG. 6, the lower case 20 and the battery cartridge 50A may gradually space apart from each other while extending from the lower side towards the upper side of the lower case 20 when seen from an arrangement direction of the both side walls 12 of the lower case 20.

Figure 8:
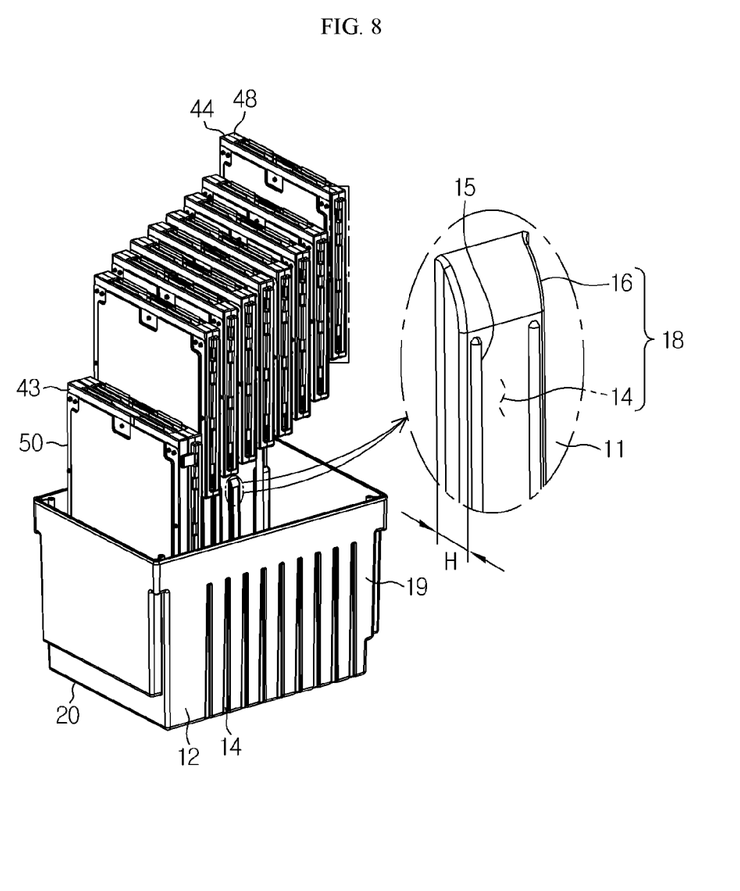
FIGS. 8 and 9 are schematic views for explaining a method for assembling the battery pack of FIG. 1.
Figure 9:
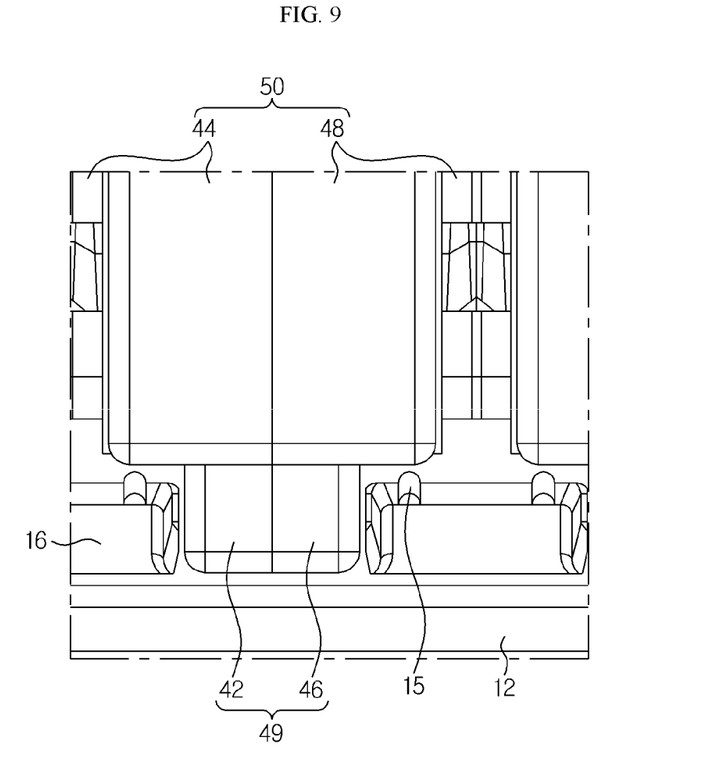

FIGS. 8 and 9 are schematic views for explaining a method for assembling the battery pack of FIG. 1. Here, FIG. 9 is a plane view explaining the combination relationship of the lower case and the battery cartridge before covering the upper case on the lower case.

Referring to FIG. 8, the lower case 20 and the battery cartridges 50 may be prepared. The lower case 20 has slots 14 on the outer circumferential 19 and the auxiliary fixating members 16 on the inner circumferential surface 11 at the both side walls 12. The auxiliary fixating members 16 protrude by a certain length H from the inner circumferential surface 11 at the lower side and the upper side of the lower case 20.

The slot 14 and the auxiliary member 16 may form one fixating member 18. The auxiliary fixating member 16 has two protrusions 15 that protrude towards a central area of the lower case 20. Meanwhile, each of the battery cartridges 50 has at least one battery cell (34 in FIG. 5) and cartridges 43, 44, 48 surrounding the battery cell 34 in a sandwich structure.

In this case, each of the battery cartridges 50 may be secured having two cartridges 44, 48 and/or three cartridges 43, 44, 48 as one unit in order to correspond to the widths between the fixating members 18 in the lower case 20. Next, the battery cartridges 50 may be accommodated in the lower case 20.

Referring to FIG. 9, the battery cartridges 50 may be fit-coupled to the lower case 20 such that they are disposed between the auxiliary fixating members 16 in the lower case 20. More specifically, the battery cartridge 50 may contact the both side walls 12 and the auxiliary fixating members 16 in the lower case 20 using the hook members 42 and the hook accommodating member 46.

The hook members 42 and the hook accommodating member 46 form one taxiing member 49. Here, the auxiliary fixating members 16 may individually fixate the battery cartridges 50 within the lower case 20. In this case, when the lower case 20 receives external force, the lower case 20 may disperse the external force using the slots 14.

Further, the lower case 20 may individually deliver the external force to the battery cartridges 50 using the auxiliary fixating members 16. Meanwhile, the auxiliary fixating members 16 may contact the battery cartridges 50 at the lower side and/or upper side of the lower case 20 using the protrusions 15 at a periphery of the taxiing member 49 of the battery cartridge 50.

The protrusions 15 may minimize motion of the battery cartridges 50 in the lower case 20 together with the auxiliary fixating members 16 while the external force is being delivered to the battery cartridges 50 through the lower case 20. Thereafter, the upper case 60 in FIG. 1 or FIG. 2 may be disposed on the lower case 20, to cover the battery cartridges 50. At this time, the lower case 20 and the upper case 60 may individually isolate the battery cartridges 50 between the auxiliary fixating members 16 within the lower case 20.

The present disclosure has been described in detail. However, it should be understood that the detailed description and specific examples, while indicating preferred embodiments of the disclosure, are given by way of illustration only, and various changes and modifications within the scope of the disclosure will become apparent to those skilled in the art from this detailed description.

What is claimed is:

1. A battery pack comprising a lower case comprising:
both side walls inclined from a lower side towards an upper side, and fixating members facing each other at the both side walls;
at least one battery cartridge accommodated in the lower case to be disposed between the fixating members; and
an upper case disposed on the lower case to cover the battery cartridge,
wherein the battery cartridge comprises a taxiing member contacting the both side walls and the fixating members in the lower case, and
wherein each of the fixating members has a concave part on an outer circumferential surface and a convex part on an inner circumferential surface in the lower case.

2. The battery pack of claim 1, wherein in the lower case, a thickness of the side wall defining the fixating members, and a thickness of the side wall between the fixating members, are the same.

3. The battery pack claim 1, wherein the both side walls space apart from each other from the lower side towards the upper side of the lower case.

4. The battery pack of claim 1, wherein the both side walls have a greater width at the upper side than at the lower side in the lower case.

5. The battery pack of claim 1, wherein each of the fixating members has a slot on the outer circumferential surface and an auxiliary fixating member corresponding to the slot on the inner circumferential surface, in the lower case.

6. The battery pack of claim 5, wherein the slot has a smaller width at the upper side than at the lower side of the lower case.

7. The battery pack of claim 5, wherein the auxiliary fixating member has protrusions extending towards the battery cartridges at a periphery of the taxiing member of the battery cartridge.

8. The battery pack of claim 1, wherein the fixating members have a greater width at the upper side than at the lower side in the lower case.

9. The battery pack of claim 1, wherein the fixating members protrude from the inner circumferential surface of the lower case by a same length.

10. The battery pack of claim 1, wherein the battery cartridge comprises at least one battery cell, and cartridges surrounding the battery cell in a sandwich structure.

11. The battery pack of claim 1, wherein the taxiing member hook-couples the cartridges of the battery cartridge.

12. The battery pack of claim 1, wherein the taxiing member is disposed in a line from the lower side towards the upper side of the lower case.

13. The battery pack of claim 1, wherein the taxiing member has a same size as a width between the fixating members at the lower side of the lower case, and has a smaller size than a width between the fixating members at the upper side of the lower case.

14. The battery pack of claim 1, wherein the taxiing member has a same size as a width between the fixating members at the lower side and the upper side of the lower case.

15. The battery pack of claim 1, wherein the taxiing member protrudes from the both side portions of the battery cartridge by a longer length at the upper side than at the lower side of the lower case.

16. The battery pack of claim 1, wherein the taxiing member comprises hook members and a hook accommodating member to be coupled with the hook members in the cartridges, in order to secure two cartridges in the battery cartridge.

17. The battery pack of claim 16, wherein the hook members are disposed in a line in an isolated shape in each of both side portions of one cartridge, and the hook accommodating member is disposed in a line in a line shape in each of the both side portions of the remaining cartridge.

18. The battery pack of claim 16, wherein the hook members and the hook accommodating member protrude from each of the both side portions of the battery cartridge by a same length at a same level.

19. The battery pack of claim 1, wherein the lower case and the battery cartridge gradually space apart from each other from the lower side towards the upper side of the lower case when seen from an arrangement direction of the both side walls.

\* \* \* \* \*